(12) United States Patent
Wolper et al.

(10) Patent No.: US 8,364,561 B2
(45) Date of Patent: Jan. 29, 2013

(54) GARMENT DIGITIZATION SYSTEM AND METHOD

(75) Inventors: Andre E. Wolper, Portland, OR (US); Isabelle Haulin, Portland, OR (US); George D. Borshukov, Portland, OR (US); Sina Maximillian Wolper, Portland, OR (US)

(73) Assignee: Embodee Corp., Portland, OR (US)

( * ) Notice: Subject to any disclaimer, the term of this patent is extended or adjusted under 35 U.S.C. 154(b) by 273 days.

(21) Appl. No.: 12/798,879

(22) Filed: Apr. 12, 2010

(65) Prior Publication Data

US 2010/0305909 A1 Dec. 2, 2010

Related U.S. Application Data

(63) Continuation-in-part of application No. 12/454,947, filed on May 26, 2009.

(51) Int. Cl.
G06Q 301/00 (2006.01)
(52) U.S. Cl. ........................ 705/27.2; 705/500; 700/132
(58) Field of Classification Search .................... 705/26; 700/132
See application file for complete search history.

(56) References Cited

U.S. PATENT DOCUMENTS

| | | | | |
|---|---|---|---|---|
| 5,850,222 | A * | 12/1998 | Cone | 345/418 |
| 6,404,426 | B1 * | 6/2002 | Weaver | 345/419 |
| 6,665,577 | B2 * | 12/2003 | Onyshkevych et al. | 700/130 |
| 6,888,640 | B2 * | 5/2005 | Spina et al. | 356/601 |
| 7,031,527 | B2 | 4/2006 | Ishikawa et al. | |
| 7,120,289 | B2 * | 10/2006 | Baumberg | 382/154 |
| 7,149,665 | B2 * | 12/2006 | Feld et al. | 703/2 |
| 2001/0026272 | A1 * | 10/2001 | Feld et al. | 345/419 |
| 2001/0030754 | A1 * | 10/2001 | Spina et al. | 356/601 |
| 2003/0076318 | A1 * | 4/2003 | Shaw-Weeks | 345/419 |
| 2004/0049309 | A1 * | 3/2004 | Gardner et al. | 700/132 |
| 2004/0239670 | A1 * | 12/2004 | Marks | 345/419 |
| 2005/0102638 | A1 * | 5/2005 | Jiang et al. | 715/855 |
| 2005/0234782 | A1 * | 10/2005 | Schackne et al. | 705/27 |
| 2006/0161572 | A1 * | 7/2006 | Vogt et al. | 707/101 |
| 2006/0171592 | A1 | 8/2006 | Amico | |
| 2009/0222127 | A1 * | 9/2009 | Lind | 700/132 |
| 2010/0036211 | A1 | 2/2010 | La Rue et al. | |

OTHER PUBLICATIONS

U.S. Appl. No. 12/454,947, filed May 26, 2009, Wolper et al.
International Search Report and Written Opinion for Int'l Patent App. No. PCT/US11/22367; Mar. 28, 2011 (8 pgs).
Turk. "Texture Synthesis on Surfaces." In Proceedings of the 28th annual conference on Computer graphics and interactive techniques (SIGGRAPH '01) [online], pp. 347-354. Published Aug. 12, 2001. Found at: http://www.csee.umbc.edu/~alark1/papers/texturing/texsynth_turk.pdf > entire document. especially Abstract; p. 347, col. 1, para 2 and col. 2, para 4; p. 349, col. 1, para 2; p. 352, col. 2, para 2 (8 pgs).
Crawley. Office Action from U.S. Appl. No. 12/454,947, dated Apr. 1, 2011 (20 pgs).

* cited by examiner

*Primary Examiner* — Scott Zare
*Assistant Examiner* — Talia Crawley
(74) *Attorney, Agent, or Firm* — Ater Wynne LLP

(57) ABSTRACT

A garment digitization system configured to determine physical attributes for any given garment including dimensional and spatial properties, mechanical attributes, optical attributes, and assembly information; a mechanism configured to take those properties and attributes and generating a digital three-dimensional model thereof; a mechanism to make such digital three-dimensional garment models available to others; and a mechanism operatively coupled with a local or remote display providing views of said digital garment.

15 Claims, 3 Drawing Sheets

GARMENT DIGITIZATION SYSTEM AND METHOD

RELATED APPLICATIONS

This application is a continuation-in-part of and claims the benefit of priority to U.S. application Ser. No. 12/454,947 filed May 26, 2009 and entitled GARMENT FIT PORTRAYAL SYSTEM AND METHOD, the disclosure of which is incorporated herein in its entirety by this reference.

FIELD OF THE INVENTION

The invention relates generally to the field of garment digitization, and the subsequent generation of computer-generated images depicting the (digitized) garment at a level of quality comparable to studio photographs of the real garment article as embodied on a real person. More particularly, the invention relates to a process whereby physical garments can be converted and draped as a three-dimensional garment model within a computer in a manner that allows these models to be generated cost-effectively and in volume. The models are then to be used for the production of computer-generated images. Such images can then be used in the marketing and sales of garments, for example in lieu of conventional studio photography. Further the three-dimensional models can also be used as digital assets for any computer application that requires visualization of garments, for example an interactive game or movie. Finally, the three-dimensional models can also be used to enable entirely new applications, including, but not limited to, the one described in U.S. patent application Ser. No. 12/454,947—GARMENT FIT PORTRAYAL SYSTEM AND METHOD.

BACKGROUND OF THE INVENTION

Apparel is universal, and drives one of the largest global industries and associated supply chains. Apparel imagery is evident everywhere, often in communications about apparel, but also in newer applications such as visual effects for video or film, or interactive entertainment such as video games, or in emerging applications such as the ONLINE TRY-ON[SM] service of garments via any web enabled device.

Apparel imagery is most often generated in a photo studio, where the article in question is shot under controlled lighting on a flat surface, or draped on a mannequin, or when worn by an actual human model. Usually multiple still shots or moving image sequences are taken, and then processed for use in print or on the web, or in design, or in movie productions.

Still images of a garment article for use on the web usually depict the garment from one or two points of view to help the viewer get an impression of the article. Sometimes more than two points of view are shown, but production costs for each point-of-view prevent more liberal use of multiple points of view. However, once a garment article has been digitized and processed into a three-dimensional model it is possible for a computer to generate a multitude of different points of view at a lower incremental cost per shot than studio photography, thus increasing efficiency—as long as the digitization and conversion of a real article of clothing into a three-dimensional model can be attained at a cost that is lower than studio photography (not possible prior to this invention), and provided that resultant image quality is photo-realistic, i.e. it is comparable in quality to more conventional studio photography.

Additional uses exist or are emerging for digital models of a garment. For example, computer graphics can use a digital garment model to generate any point-of-view (POV) image of the garment as worn—optionally without the wearer being visible ("hollow" portrayals). Other uses are the generation of point-of-view images suitable for use in on-line garment customization applications, or to enable the on-demand drape simulation of a given digital garment on any body model (to assess style or fit of the garment), or to animate the garment as part of an entertainment or review experience.

Innovations in garment pattern digitization are summarized in U.S. Pat. No. 7,031,527 or in US Patent Application US2006/0171592. These and other related developments in the garment industry deal with the digitization of garment design & garment production data. Such systems aim to facilitate more cost effective design, development & manufacturing of garments from raw materials, whereas the invention described herein enables the reverse—namely to take existing garments from the real world and create cost-effective, faithful digital reproductions thereof.

Thus, what is described herein is a garment digitization system and method than can support the cost-effective generation of digital garment models with enough inherent data to enable the generation of photorealistic images from said models using advanced computer graphics. This in turn enables an alternative means to conventional photography as well as enable a range of new uses as described within.

SUMMARY OF THE INVENTION

High quality digital models of garments exist, but highly trained computer graphics artists have to model them manually in a computer over many days with painstaking attention to detail in order to achieve high levels of realism. The limited availability of skilled computer graphics artists, and the time required to generate models with high levels of realism results in production costs of thousands of dollars, thus restricting the use of such models to large budget films or games.

Alternatively, some garments are designed using computer-assisted tools for pattern making, some of which enable apparel designers to model and render their patterns for three-dimensional viewing on a computer screen. Representative makers of such systems are Gerber Technology of Connecticut, USA; Lectra of France; and Optitex or Browzwear of Israel. However, these systems focus on textile manufacturing-oriented requirements, such as accurate pattern file generation, nesting of patterns on to fabric for yield maximization, and related functionality. These systems, while useful in the creation of a garment design, typically lack the ability to create photo-realistic models of the garments, in part because some of the visual details inherent in a garment are only generated down-stream during manufacturing (such as the wash in a pair of denim jeans, for example), and in part because the creation of photo-realistic digital models using computer-assisted tools requires the aforementioned three-dimensional modeling and rendering effort, which is very labor intensive and also requires skills not typically found in the textile and garment design industry.

A system and method for the digitization of a specific sample garment into a high-quality, cost-effective digital model is disclosed. The digitization method employs digital capture via photography or scanning, data processing and automation to generate a digital model of the garment that is dimensionally faithful to the original article, and includes the visual detail that is apparent in the original article. More specifically, the digital model includes mechanical properties, which enable down-stream simulation of the digital garment for use in fit simulation and also animation. Additionally, the digital garment model includes optical properties, such as its reflectance including color, which allow the model to properly respond to simulated lighting, thus further increasing the realism and utility of the model.

The disclosed method extracts the mechanical, optical, and shape data from the sample garment and transforms the extracted data into a digital model with faithful detail and fidelity while minimizing the use of manual (human-assisted) computer graphics modeling to reduce production costs by an order of magnitude. This last point is key in order to enable garment digitization at a greater scale, without impediments such as the limited availability of highly skilled computer graphics artists or other high labor cost components.

DETAILED DESCRIPTION OF THE PREFERRED EMBODIMENTS

Figure 1:
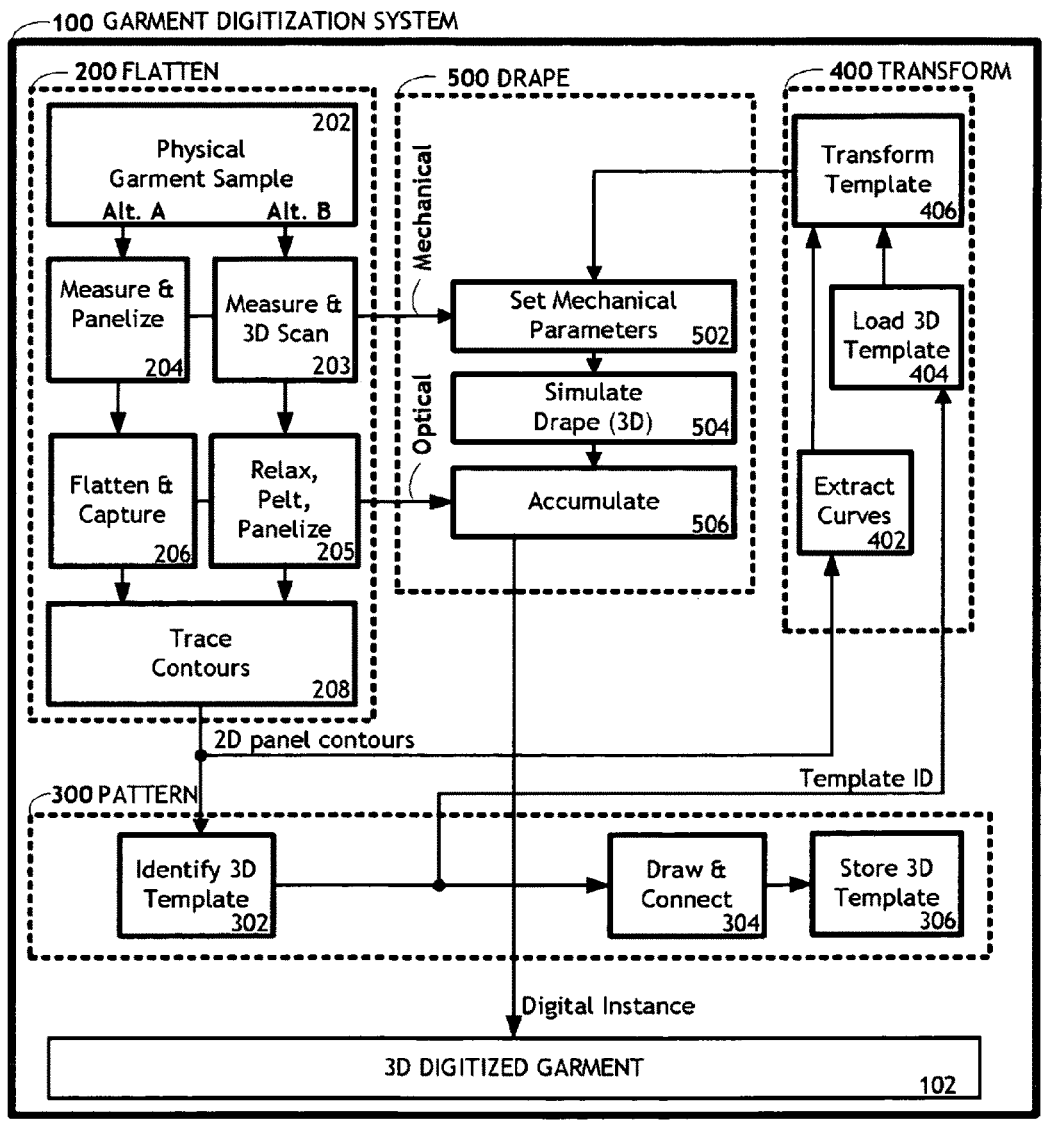
FIG. 1 is a process flow and functional block diagram showing the steps by which a physical garment sample is converted into a digital model. The method is specifically architected to enable the cost-effective generation of digital garments for a wide variety of uses such as described in the background of the invention.

Referring to FIG. 1, a digitized garment model is generated through typically three, or perhaps four Stages, named as follows:
1. "200—FLATTEN", which receives a garment sample in a specific size and outputs it in a two-dimensional digital form consisting of flat panels, including mechanical, optical and contour information for each. A panel is defined as a section of the garment's surface material, along with information on how it was or is to be connected to the other panels of a given garment. Taken together all panels of a given garment constitute the entire surface of said garment. The panels are output as traced contours to subsequent stages, together with optical attributes representing their appearance, and mechanical attributes governing their behavior when subjected to forces.
2. "300—PATTERN", which exists to generate a three-dimensional template for a given garment sample provided that it has not been previously established, based on input from Stage 200. The three-dimensional template is a generalized version of a garment style that aids in the rapid production of a three-dimensional digitized garment, and is stored for subsequent retrieval via a unique template ID by Stage 400.
3. "400—TRANSFORM", which also takes the flat output of Stage 200 and combines it with a matching three-dimensional template to get it back to the three-dimensional form it is intended to be. The three-dimensional template file is transformed into a three-dimensional garment file that accurately represents the garment sample in question, ready for a drape simulation of said garment sample, and outputted to Stage 500.
4. "500—DRAPE", which takes a specific three-dimensional garment file from Stage 400 and runs a drape simulation on a reference body model using the mechanical parameters for that specific garment. The resultant drape simulation is combined with the optical information and is outputted as a complete digital instance of the specific garment sample. This output can be used by another system or application for future fit simulation of the specific garment on other body models, and for point-of-view dependent computer renderings thereof under simulated lighting, i.e. for uses such as those described in the background of this invention.

FLATTEN Stage 200: The process begins with a physical garment sample at step 202. Said sample is a complete garment with all construction details such as stitches, buttons, pleats, and other design elements as appropriate. Within this stage, two principal alternatives to processing of the garment are available. The first alternative is a process that is destructive to the garment sample, titled "Alt. A" within step 202. Alt. A is image capture based and can be implemented with simpler equipment, capturing image, mechanical, and optical data, and with computers running two-dimensional image processing software capable of tracing outlines of an image capture. The second alternative is scanner based, non-destructive to the garment sample, and titled "Alt. B" within step 202. Alt. B requires more sophisticated equipment than Alt. A, such as a three-dimensional scanner. Both alternatives within Stage 200 generate substantially similar image, mechanical and optical data, which is passed as output to subsequent stages including a Stage 300 pattern generator configured to accept such data (both alternatives, whether image capture based or whether three-dimensional scanner based, require the capability of processing step 208, and in combination shall be referred to hereafter as a capture apparatus).

Alternative A: Step 204 takes a garment sample and analyzes it for the purpose of panelizing it. An operator experienced in this step will be aware of similarly panelized garments that may have been produced at a previous time. A garment is panelized with a physical cutting tool such that it matches a previous panelized garment to the greatest extent possible. For instance, if a T-shirt has previously been panelized into four panels, a new T-shirt will also be cut into four panels if possible. The criteria to be applied in this decision-making are further described in the following paragraphs.

Once analyzed, the garment is subjected to a measurement of the fabric's mechanical properties, include one or more of weight, weave, bend resistance, stretch resistance, and shear resistance. It is desirable, but not necessary, to have multiple measurements taken. For instance, if a garment is made of only one material, then a single measurement suffices. If the garment is made of multiple materials with very different mechanical attributes (for instance, each of the multiple materials having very different resistance to bending), then a measurement can be taken for each of the material types within the garment. The more representative the material attribute measurement is of each material within the garment, the better the drape simulation accuracy at future step 402. Only one material measurement may be obtained even for a multi-material garment if one measurement is sufficiently representative. Mechanical properties can be obtained through the use of a measurement mechanism, such as the fabric industry's Kawabata Evaluation System for Fabrics (KES-F), or a similar method. The resultant data is made available to subsequent stages 502, where it governs the set up of future drape simulations of this garment.

Next the garment sample is panelized. Constituent panels are obtained via a garment cutting mechanism, either a hand-tool such as scissors, or a programmable cutting mechanism, such as a laser system. Panels can be obtained by cutting along seams; however not all seams must necessarily be cut. The resultant panels can be sub-assemblies of multiple sewn pattern pieces as long as a given panel is able to lay flat with all of its fabric in a relaxed state devoid of stretch or compression. This is necessary because subsequent processing at steps 302 and 402 requires shape information from these panels with their fabric presumed relaxed in order to generate accurate dimensional information, which is critical to the generation of subsequent three-dimensional DIGITIZED GARMENTS, especially if they are to be highly representative of the actual garment sample.

Once the panels and their mechanical properties have been obtained, the next step is 206, Flatten & Capture. The panels are mounted on a flat background of contrasting color, with each panel also flat and reasonably free of wrinkles. The capture process avoids the presence of light fall-off or shadows within the panels by casting spatially non-varying illumination upon the panels. In one embodiment of the system, the illuminated flat panels are photographed with standard studio digital camera equipment. The reflected light is also recorded with a light capture mechanism and processed into two or three components, a "color bitmap", a "reflectance map", and, optionally, a "micro-detail map", as defined below (for this purpose, the use of a commonly available, operable-configurable reflectometer, or spectrophotometer, shall be referred to hereafter as a light capture mechanism).

Color Bitmap: This is a two-dimensional record of color values for each point of the panels subject to the resolution of the image. The Color Bitmap enables reproduction of color driven visual detail in the garment's surface, such as stitching, color variation such as intentional fading, graphics, and other details. The Color Bitmap will be used as a color texture map in subsequent computer renderings of the final three-dimensional model. Using light polarization filters (on the lights and camera lens) the system can optionally acquire two separate images—one of the diffusely reflected light (where polarization is lost) and one of the specularly reflected light (where polarization is preserved). When only a single color image is acquired (no polarization filters deployed) the diffuse reflectance (albedo) map is approximated as a saturated version of the single Color Bitmap and the specular reflectance map as grayscale version of the single Color Bitmap. In addition, edge detection algorithms will use the Color Bitmap in step 402 to extract each panel's outline curves.

Reflectance Map: this is a multi-dimensional function map—one that determines the amount of light that is reflected for each point (pixel) of the panel, at multiple angles of entry and exit. It requires separate equipment in order to attain most precise bi-directional surface reflectance, which can be captured optionally. By default, reflectance data can be assigned to each panel from a nearest match of a bi-directional data measurement retrieved from a database of previously acquired samples, or the values from an analytical model such as Lambert, Blinn or Cook-Torrance can be assigned. However, if more sophisticated reflectance recording equipment is available, then more detailed bi-directional surface reflectance measurement can be performed per specific panel, and used instead of the default values, enabling a higher level of computer rendering quality for subsequent users of the digitized garment model.

Micro-detail Map: In an enhanced embodiment of this invention, the mounted panels can be additionally scanned using structured light or via three-dimensional camera technology or other shape acquisition technique to obtain additional bump/normal and depth/displacement maps (for example surface normals or depth information) as a third component of the optical information that is being gathered. We define such Micro-detail as spatial information further enhancing the surface definition, and thus, affecting the visual reproduction of garment material in a computer rendering thereof. Such spatial information can enhance the reproduction of the appearance of the garment material in a computer rendering if rendering technology with the ability to consider the Micro-detail Map is used. Such rendering technology considers the micro-detail in its calculation of the surface shading variation being caused by said micro-detail—and can, for example, produce the minute shadows that would be present in the weave of a fabric.

The Color Bitmap, the Reflectance Map with its bi-directional reflectance data (or the parameters of an appropriate analytical model), and the (optional) Micro-detail Map are passed on as the garment's optical attributes describing the panel surfaces to stage 500 DRAPE where they are accumulated as part of the digitized garment. This set of optical attributes constitutes the information controlling point-of-view dependent appearance under simulated lighting in subsequent computer renderings of the digital model.

Alternative B: As in Alternative A, Step 203 measures the garment's mechanical attributes, using the same or similar measurement mechanism. Once completed, the mechanical attributes are passed to Step 502, and the garment sample is hung on a mannequin or otherwise suspended such that it can be used with a three-dimensional scanner. The garment should ideally be hung in such a manner that the garment's fabric is in its relaxed state, i.e. devoid of any tension or compression within the fabric. This is important in order to get accurate dimensional information from the scan. The three-dimensional scanner then is set to produce a three-dimensional geometric representation of the garment's surface. The three-dimensional scanner, if augmented with a light capture mechanism, also records data from which a Color Bitmap, a Reflectance Map, and the Micro-detail Map for every point on the surface of the garment is derived, i.e. the same optical attributes described in Alternative A. The three maps are passed along with the geometric representation of the garment to step 205.

Step 205 begins by reverting residual tension or compression—if any—within the geometric representation of the fabric. This can be done by use of an advanced image-processing algorithm implemented as a program on a computer system as follows. In one embodiment of the invention, the detail within the Color Bitmap is examined for signs of stretch or compression. This is done by sampling a section of the Color Bitmap where the underlying fabric is known to be relaxed, and comparing the weave expressed in the relaxed section of the Color Bitmap with the weave as expressed in the remainder of the Color Bitmap's area. If the comparison between them results in a mismatch of the fabric's weave, the areas that do not match the sample section are determined to show signs of a compressed (or stretched) weave. This is then compensated by (a) adjusting each point in the underlying three-dimensional geometry such that spatial relationships of the geometry are obtained, as they would exist without tension or compression; and (b) adjusting the Color Bitmap by scaling it to match the adjusted geometry in size. Thus "relaxed" three-dimensional geometry is obtained that truly reflects the size of the garment sample without the presence of any stretch or compression, if such otherwise would be characteristic of the material (a computer program implementing this aforementioned advanced image-processing algorithm shall be referred to hereafter as a tension and compression reverting image processing mechanism).

Next, the relaxed geometry is digitally pelted with a technique similar to the one described by Dan Piponi and George Borshukov, "Seamless Texture Mapping of Subdivision Surfaces by Model Pelting and Texture Blending," in ACM SIGGRAPH 2000 Conference Proceedings, Annual Conference Series, pages 471-478, August 2000 (a computer program implementing a pelting technique such as this shall be referred to hereafter as a pelting mechanism). This results in the unfolding of the geometry into a completely two-dimensional, flat state that is dimensionally accurate to the entire underlying garment, and with the optical attributes for each point on the flattened geometry. Once pelted, the two-dimensional flat digital representation of the garment can now be "digitally panelized" by editing the image into panels corresponding to the same panels that would have been obtained via Alternative A (but without the physical cutting and destruction that Alternative A requires). The optical attributes are passed to Step 506, akin to what would have been, had Alternative A been executed instead.

Both Alternative A and Alternative B pass the same output into Step 208: A two-dimensional Color Bitmap either generated by the Capture in step 206, or by the digitally panelized three-dimensional scan from step 205. Either way, the Color Bitmap can now be processed on a computer, using image-processing algorithms to generate a two-dimensional contour map of each panel. The resultant output is essentially a tracing of the perimeter of each panel as it was cut (physically or digitally), to scale, i.e. dimensionally faithful to the actual article, and completes the function of the capture apparatus (a computer program implementing such perimeter tracing is hereafter referred to as a contour outline mechanism). The resultant two-dimensional panel contours can be used to generate a three-dimensional template for this type of garment style via Stage 300 if a suitable template does not yet exist; and also serves as the piece of information that enables Stage 400 to generate a dimensionally faithful digital instance of the particular garment being processed.

PATTERN Stage 300: The first step of this stage is to determine if the incoming two-dimensional panel contours have a match in a three-dimensional template that has been previously constructed. If so, the ID of a three-dimensional template with matching panels is determined and passed on the following stage. If not, a new template ID is defined, which will be passed on to the next stage. Additionally stage 300 proceeds to generate a three-dimensional template generation job. Such a job will be assigned to a human operator with sufficient skills (and equipped, for example, with a commonly available, operable-configurable, three-dimensional modeling software tool) to draw or generate a three-dimensional template—likely as a variant of a template that has been previously generated—and once such a suitable three-dimensional template has been generated it is stored for future retrieval via its template ID.

Figure 2:
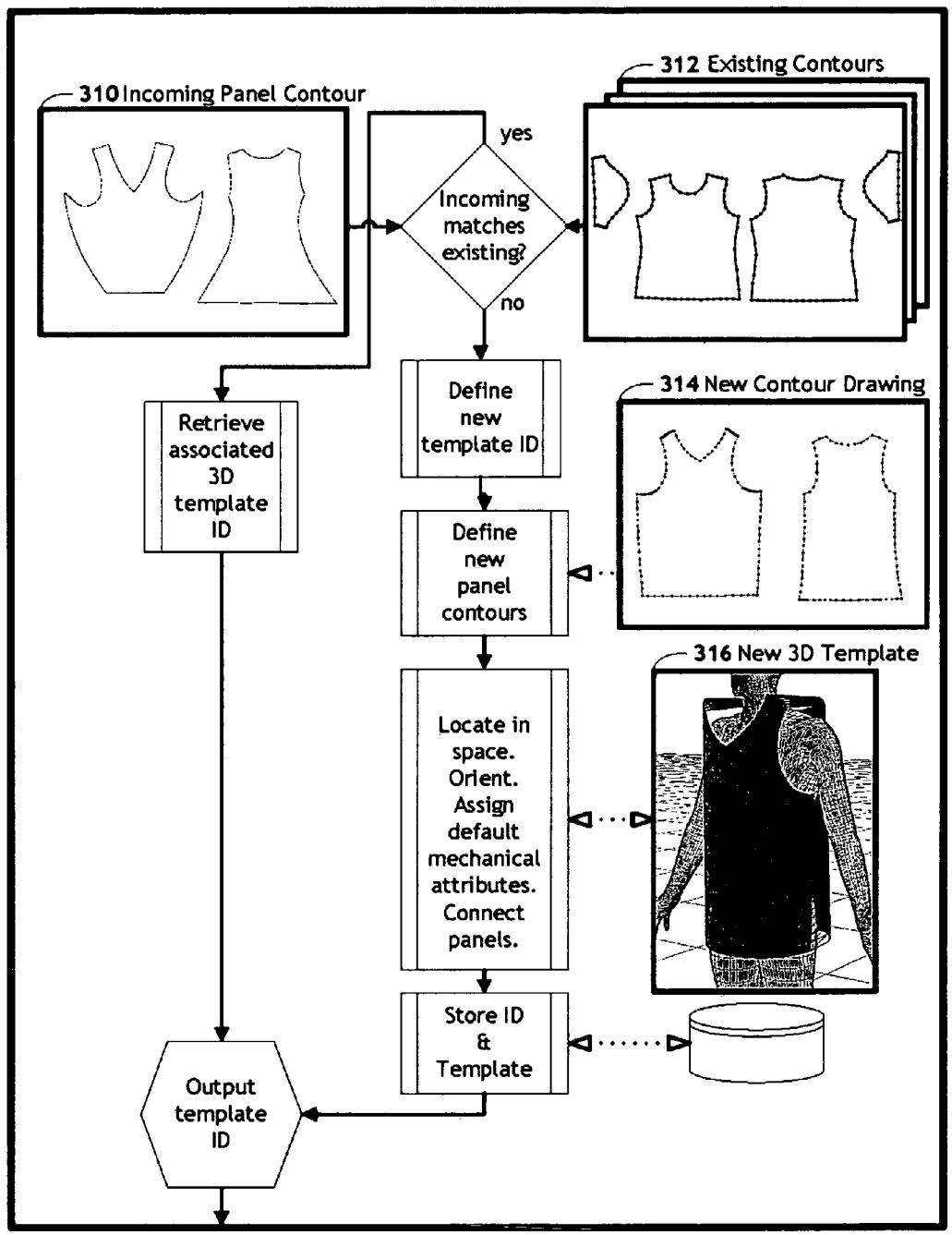
FIG. 2 is a process flow and functional block diagram showing the steps by which a re-usable three-dimensional template of a garment style is generated.

Referring to FIG. 2, the following provides more detail on the key steps that comprise Stage 300, and which are used to generate a three-dimensional template.

A three-dimensional template is a generalized, digital representation of a given garment style, not necessarily representative of a specific garment's dimensions and mechanical behavior. The three-dimensional template consists of a number of panels and the connections between them.

The system preferably builds on the existence of a three-dimensional template pattern library that has to be built once in order to achieve economies of scale for the production of digitized garments over time. When a new garment sample is processed, the closest existing template pattern is retrieved from the template library either through manual (human operator) selection or through the use of a computer assisted search.

A new three-dimensional template starts by having its panels drawn as a two-dimensional shape with a contour defining its perimeter. The perimeter is defined through a series of points, which give the panel its shape. An example of this is shown in FIG. 2 at 314. Next a set of panels, with all their points defined, is assembled into a three-dimensional template.

The template is preferably built using a commonly available three-dimensional authoring tool such as Google SketchUp, Autodesk Maya, Autodesk XSI (or other suitable alternative; such a software tool, operated as described herein, shall be referred to hereafter as a three-dimensional template generation and storage mechanism). Using such a took each panel is placed in three-dimensional space with their typical orientation vis-à-vis a human body model, with each panel somewhat preformed by the operator to a initial three-dimensional shape suitable as a starting state for subsequent draping. Next, a subset of each panel's points are designated connection points, i.e. they are linked together into corresponding pairs defining how the various panels shall be digitally stitched (or zippered or buttoned) together. An example of this is shown in FIG. 2 at 316.

Each panel in the three-dimensional template has default parameters assigned, namely the panel's default dimensions and default mechanical properties. A three-dimensional template's default panel dimensions and default mechanical properties can (but must not) correspond to a specific garment sample until the template is transformed and draped to represent a specific instance of a garment sample. In summary, a three-dimensional template consists of the following information:

1. A number of panels that have been drawn and are expected to correspond to a typical garment style that will be panelized for the purposes of digitization. These panels exist as points defining their perimeter, and also define how the panels can be connected together to form a garment. Further, these panels have an initial deformation and are oriented in three-dimensional space ready to be drawn together and simulated on a body model. The specific dimensions of each panel have default values, which can be adjusted in subsequent uses of the template to match those of a specific garment when the template is used for actual digitization of a specific garment.
2. Mechanical information for each panel, which can be used by a simulator to govern the panel's (and thus the digital garment's) draping behavior when subjected to forces such as gravity. This mechanical information is a default value that will be substituted with mechanical information from a specific garment when the template is used for actual digitization of a specific garment at a subsequent time.

Taken together, the three-dimensional template data govern the process that will connect the panels back together again during the DRAPE stage.

Given a sufficiently large template library, an identical template pattern will typically be found. If not, a three-dimensional software tool operator, creating a new variant, may perform some adjustments on an existing template pattern. For example, some panels may be removed, some panels may be added, some panels may be cut into two distinct panels to be stitched together, or some panel shapes may be adjusted. This process requires a skilled three-dimensional software tool operator, however, it will decrease over time as the template library grows. Thus the operation of this system will decrease in cost over time because the majority of the garment industry uses styles with patterns that are used repeatedly, with relatively minor variations in panel dimensions, fabric and detailing.

TRANSFORM Stage 400: Beginning with Step 402, the incoming two-dimensional panel contours from an actual garment sample being processed are used and converted through a feature point extraction and curve-fitting algorithm to vector based curves (for example Bezier curves) that represent the outlines of each panel. These extracted curves provide accurate dimensional information of the garment in its flat, relaxed (i.e. not stretched or compressed) state. The extracted curves will be used by an existing three-dimensional template in a subsequent step.

Next, step 404 loads a previously constructed three-dimensional template from the template store using the unique template ID that was passed into the TRANSFORM stage. This three-dimensional template has the same number of panels, and the same connective relationship among them as the two-dimensional panel outlines that were created during panelization in Stage 200. There does not need to be a match of the precise dimensions between the contours of the template's panels and the panel contours produced by Stage 200; however there does need to be a match in terms of the number of panels, their general shape, and the original (pre-panelized) connections among them.

Step 406 will proceed to transform the existing three-dimensional template's panel size and shape to exactly match those of curves extracted from 402. In this way, a general three-dimensional garment template can assume the precise dimensions and size of a specific garment sample, which has been flattened into a matching number of panels by the functions in Stage 200. The template transformation results in a new instance of the referenced three-dimensional template pattern that has now assumed the exact dimensions of the garment sample being processed. This transformation step is automatable and performs two tasks: for each panel, identify the matching extracted curve, match that curve's shape, and match key points on the curve, such as the points needing to be stitched (or zippered or buttoned) together. The output of this last step in Stage 400 is an instance of a three-dimensional template that is ready for use in Stage 500.

The advantage of this method is that once a particular three-dimensional template is created and stored in Stage 300, said template can be repeatedly reused as long as a given (new) garment sample, once flattened, finds a match in the three-dimensional template store. This is a key enabler of lower digital garment production costs, because the three-dimensional template work that is performed is re-used and needs to be performed only once for a particular garment type or style (steps 402, 404, and 406, when completed with a commonly available, operable-configurable, three-dimensional modeling software tool shall be referred to hereafter as a template transformation mechanism).

DRAPE Stage 500: The final step in the creation of a digitized garment is to create a drape of the garment sample on the model of a human body. This drape result is expressed as a three-dimensional geometry computer file, in a commonly available format (for example as a polygonal mesh expressed in industry standard .OBJ, .X3D, or similar file format) that is compatible with commonly available three-dimensional modeling software such as Google SketchUp, Autodesk Maya, Autodesk XSI, or similar tools.

In addition, the resultant three-dimensional geometry file is augmented with additional files, which enable future re-simulation, animation, and rendering of the garment, by applications such as the ones described in the background of this invention.

Step 502 commences with the garment specific instance of a three-dimensional template, and substitutes the mechanical parameters within it with those from the actual garment sample being processed.

Step 504 takes the resultant three-dimensional template instance and processes it into a dataset for use with a suitable dynamic simulation via a commonly available physics engine, such as a cloth simulator. The cloth simulator proceeds to run a cloth simulation of the garment sample on a human body model by drawing together the panels at their connection points, while subjecting the panels to simulated forces such as gravity—referred hereafter as a stitching mechanism. The garment's specific three-dimensional template instance is thereby converted from its preformed quasi-flat state of its panels into a draped, fully expressed three-dimensional shape. The fully draped version of the garment is again expressed in a common three-dimensional geometry file (steps 502 and 504, when completed with a commonly available, operable-configurable, three-dimensional modeling software tool shall be referred to hereafter as a drape simulation mechanism).

Step 506 establishes correspondence between the surface points of the draped garment's shape expressed in .OBJ and the [u, v] coordinates (as commonly used in three-dimensional computer renderings) of the optical information produced earlier by step 206. This is useful to generate a subsequent rendering with high fidelity of the garment's surface attributes. Step 506 accumulates all data and creates an instance of the digital garment, which includes one or more of the following pieces of information:

1. Shape information: three-dimensional geometry file;
2. Optical information: Color Bitmap, a Reflectance Map with bi-directional reflectance data, and, optionally, a Micro-detail Map with bump/normal and depth/displacement;
3. Dynamic Simulation information: suitable format including the mechanical attributes measured in steps 203 or 204.

A computer program implementing Step 506 and storing all of the accumulated data in one or more files shall be referred to hereafter as a collection mechanism.

The final result is a three-dimensional digitized garment that is a dimensionally faithful reproduction of a real-world physical garment sample, and which contains all data needed by any application seeking to simulate and render garments derived from real world garment samples, with enough accuracy to support applications requiring precise size correspondence (between a real-world garment and a corresponding digital instance thereof), and a full complement of optical attributes sufficient to generate full realism of garment depiction via a high quality rendering.

Figure 3:
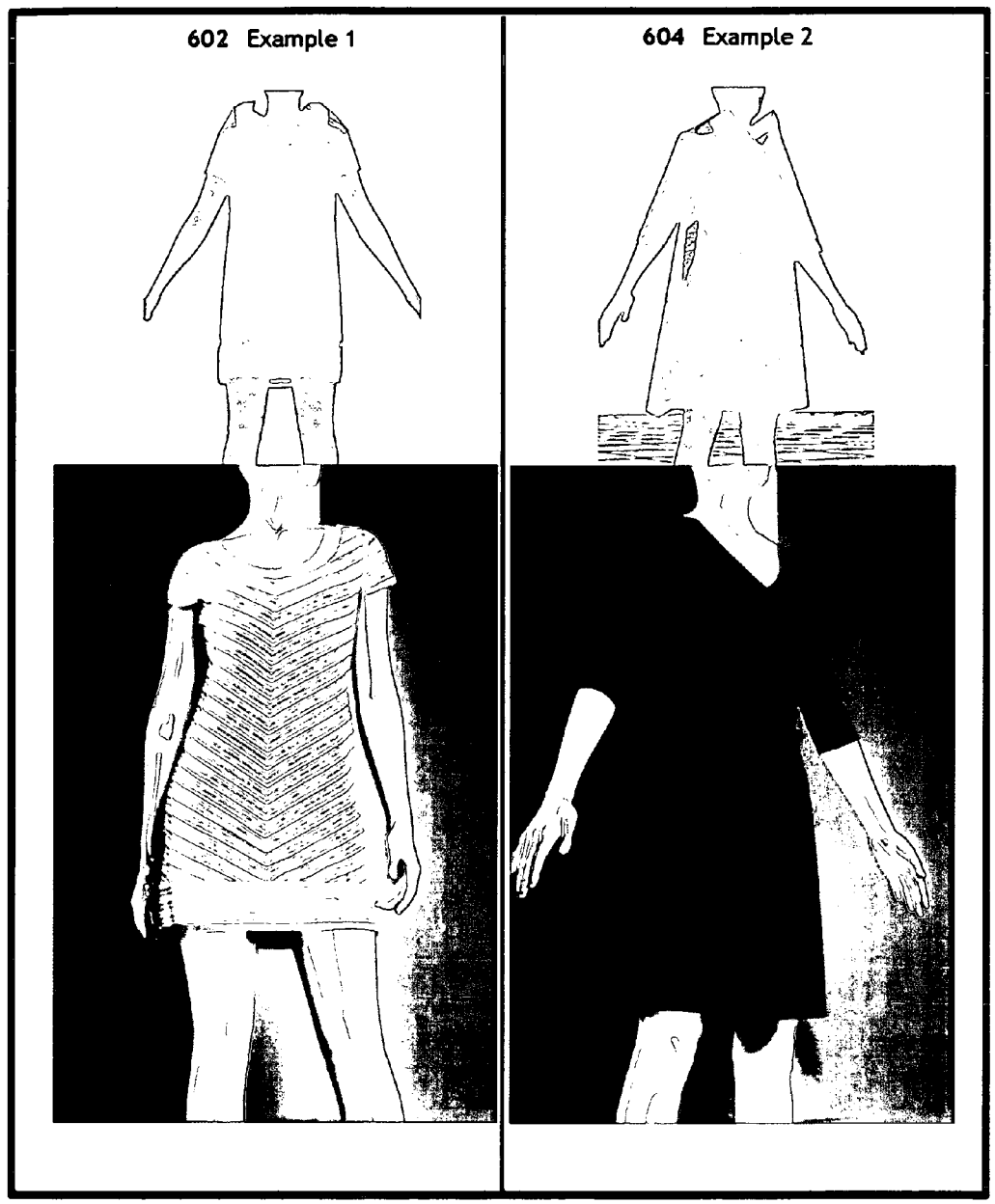
FIG. 3 is a screen-grab of two exemplary results of advanced computer graphics rendering of side-by-side fitted and draped and lighted garments, the upper portions illustrating fitted but only partially stitched versions of the rendered garment and the lower portions illustrating a finished, photo-quality version of the same completed garment.

In summary, the invention described here enables the efficient production of digital instances, or replicas, of real-world garments. FIG. 3 shows two examples of the results once a digital garment instance has been produced and rendered by a system capable of advanced computer graphics rendering. Example 1, at 602, is a dress that has considerable visual detail in the weave of the fabric comprising it. Example 2, at 604, is a dress with multiple layers and more complex connectivity among the panels. The images in the upper half of 602 and 604 are views of a particular garment template (in the form previously described at 316) with contours matching those of an actual garment sample. Once the garment digitization data are fully processed by Stages 400 and 500, and subsequently rendered, the images in the lower half of 602 and 604 may be seen to represent the visual realism and detail inherent in a three-dimensional digitized garment produced by the method described herein. As can be seen by these examples they possess a level of visual fidelity comparable to conventional, high-quality studio photography of actual garment samples. However, these digital three-dimensional digitized garment models are capable of a much wider range of applications, such as any computer application that requires visualization of garments, for example an interactive game or movie. Importantly, the digitization and realistic rendering do not require repeated, manual three-dimensional modeling for their creation. Finally, the three-dimensional models can also be used to enable entirely new applications, including, but not limited to, the one described in U.S. patent application Ser. No. 12/454,947—GARMENT FIT PORTRAYAL SYSTEM AND METHOD.

(Those of ordinary skill will appreciate that the above is accomplished in accordance with one embodiment of the invention through the use of garment seamstresses or others skilled in the deconstruction of the garments, the use of three-dimensional computer artist operators and standard three-dimensional modeling software for the patterning of three-dimensional templates, and the use of trained operators for the transformation and draping using a suitable suite of software programs implementing the functional system as described herein. The software system in accordance with one embodiment of the invention includes a web browser based display window enabling views of different stages of the Garment Digitization System, each enabling access to a internet-based server resource, and allowing the various operators to complete their stage of the work from any web-enabled device.)

It will be understood that the present invention is not limited to the method or detail of construction, fabrication, material, application or use described and illustrated herein. Indeed, any suitable variation of fabrication, use, or application is contemplated as an alternative embodiment, and thus is within the spirit and scope, of the invention.

It is further intended that any other embodiments of the present invention that result from any changes in application or method of use or operation, configuration, method of manufacture, shape, size, or material, which are not specified within the detailed written description or illustrations contained herein yet would be understood by one skilled in the art, are within the scope of the present invention.

Finally, those of skill in the art will appreciate that the invented method, system and apparatus described and illustrated herein may be implemented in software, firmware or hardware, or any suitable combination thereof. Preferably, the method system and apparatus are implemented in a combination of the three, for purposes of low cost and flexibility. Thus, those of skill in the art will appreciate that embodiments of the methods and system of the invention may be implemented by a machine such as a special-purpose, proprietary server-based programmed computer or microprocessor by which instructions are executed, the instructions being stored for execution on a computer-readable medium and being executed by any suitable instruction processor. Where appropriate, serial processing by a single processor or desktop computer is contemplated. Where appropriate, parallel processing by one processor with multiple, parallel execution units, or by two or more concurrently operable, parallel processors each with one or more execution units (such as high-speed specialized processing units such as Graphic Processors (GPUs) or other hardware accelerators for fluid, real-time simulation) is contemplated. Any one or more of such processors and architectures is contemplated as being within the spirit and scope of the invention.

Accordingly, while the present invention has been shown and described with reference to the foregoing embodiments of the invented apparatus, it will be apparent to those skilled in the art that other changes in form and detail may be made therein without departing from the spirit and scope of the invention as defined in the appended claims.

We claim:

1. A garment digitization system configured to operate on either or both of a desktop computer system and a specialized internet server computer linked over a network to at least one web-enabled device, said computer or combination of computers forming a system comprising:
   a capture apparatus including one or both of a camera and an image scanner, and further configured, when executed by suitable circuitry of a computing device, to process a physical garment sample into a digital representation thereof, the digital representation consisting of two-dimensional contours from a flat state of each panel of said garment sample;
   a three-dimensional template generation and storage mechanism configured, when executed on a desktop or server-based computer, to produce and store generalized three-dimensional templates reflecting the two-dimensional panel contours of garments that have been processed into panels, each template including a grouping of panels that are oriented, in virtual three-dimensional space, with their connections vis-a-vis each other defined, and each panel having default mechanical attributes thereof defined;
   a template transformation mechanism configured, when executed on a desktop or server-based, computer, to select a stored generalized three-dimensional template of a garment style that closely matches a style of a digital representation of a particular digitally captured garment sample, and further configured to transform the generalized template into a copy of the particular garment sample, wherein each panel within the copy assumes the precise dimensions of the particular garment sample; and
   a drape simulation mechanism configured on a desktop or server-based computer operatively coupled with the capture apparatus, the three-dimensional template generation and storage mechanism, and the template transformation mechanism, the drape simulation mechanism further configured to simulate a three-dimensional form fit of a garment sample onto a body represented in the simulator mechanism, the drape simulation mechanism configured to produce a representative drape of the garment sample, and the simulator mechanism further compiling the resultant representative drape together with the garment sample's mechanical and optical attributes into a digital instance of the garment sample suitable for further use.

2. The system of claim 1 further comprising: a measurement mechanism configured for generating mechanical attributes for one or more points on the surface of the garment.

3. The system of claim 2 further comprising: a garment cutting mechanism, configured to generate multiple physical pieces, each resultant piece having the ability to lay flat, and then having all pieces mounted on to a flat substrate.

4. The system of claim 3 further comprising:
   a light capture mechanism configured for generating optical attributes of each panel, including Color Bitmap, a Reflectance map with bi-directional reflectance data, a Micro-detail Map with bump/normal and depth/displacement, and configured with a contour outline mechanism for processing their outlines into traced two-dimensional panel contours.

5. The system of claim 2 further comprising:
a scanning mechanism, suspending the garment sample in space and utilizing a three-dimensional scanner to create a three-dimensional geometric representation of the surface of the garment sample, optionally including a light capture mechanism gathering optical attributes of the surface such as a Color Bitmap, a Reflectance Map with bi-directional reflectance data, and an optional Micro-detail Map.

6. The system of claim 5 further comprising, a tension and compression reverting image processing mechanism configured to adjust the three-dimensional geometric representation and its corresponding surface optical attributes or the garment such that they become of the physical dimension they would have if the fabric were free of any tension or compression due to the effects of gravity or any other force acting upon the garment's fabric while suspended in space.

7. The system of claim 6 further comprising:
a pelting mechanism which creates a flat representation of the adjusted three-dimensional geometric representation, slices it into flat two-dimensional panels along with their optical attributes, and configured with a contour outline mechanism to process their outlines into traced two-dimensional panel contours.

8. The system of claim 1 further comprising:
a three-dimensional modeling software tool configurable by an operator to generate a three-dimensional template of a garment consisting of panels and connections among them.

9. The system of claim 8, wherein each panel in the three-dimensional template has mechanical attributes including one or more of weight, weave, bend resistance, stretch resistance, and shear resistance, and wherein the optical attributes include one or more values of color and reflectance.

10. The system of claim 1, wherein the template transformation mechanism is configured to copy a suitable three-dimensional template and to change each panel's dimensions in the copy to match those of a particular garment's two-dimensional panel contours.

11. The system of claim 1, wherein the drape simulation mechanism includes a stitching mechanism for digitally stitching together pieces of the garment while placed around a human body model resident within the simulation mechanism and subjecting the garment and body model together to one or more of the simulated force of gravity, and any forces resulting from the panels being stitched together over and against the human body model.

12. The system of claim 11 further comprising:
a collection mechanism configured to compile the results of the mechanical attribute measurement, the optical attribute capture, and the simulation result to produce a digital instance of a sample garment.

13. A method for garment digitization providing a digital instance of one or more physical real-world garment samples, the method comprising:
providing one or more proprietary computers each including one or more processors configured to execute machine-readable instructions thereon, the one or more computers being operatively connected to the Internet; and
providing machine-readable instructions on the one or more computers, the instructions being specially configured, when executed in one or more processors on the one or more computers, to cause the one or more computers to perform garment digitization and simulation operations comprising:
a) processing garment sample data from a physical garment sample into optical attribute data including a Color Bitmap, and two-dimensional contours thereof:
b) identifying, from among plural garment templates stored in a template database, a garment template that closely matches a garment style of the physical garment sample;
c) processing two-dimensional contour data of the selected garment template into three-dimensional geometric shapes approximating the original form of the physical garment sample;
d) simulating a fit of three-dimensional garment geometry on a three-dimensional body model resident within the simulator into one or more digital three-dimensional garment geometry models with their drape expressed; and
e) compiling the one or more three-dimensional garment geometry models together with data including one or more of optical attribute data and mechanical attribute data into a set of data constituting the digital instance of one or more garment samples for use in future renderings of garment portrayals.

14. The method of claim 13, wherein one or more garment samples are plural, and wherein steps a) through e) are performed concurrently and with respect to each of the garment samples data.

15. An on-line digital garment server comprising:
a server-side application software program stored on a non-transitory data storage medium of the server and including machine-readable instructions configured, when executed by data processing circuitry of the server, to cause the server to perform specialized digital garment processing actions, the instructions including:
a) instructions for processing garment sample data from a physical garment sample into optical attribute data including a Color Bitmap, and two-dimensional contours thereof;
b) instructions for identifying, from among plural garment templates stored in a template database, a garment template that closely matches a garment style of the physical garment sample;
c) instructions for processing two-dimensional contour data of the selected garment template into three-dimensional geometric shapes approximating the original form of the physical garment sample; and
d) instructions for simulating a fit of three-dimensional garment geometry on a three-dimensional body model resident within the simulator into one or more digital three-dimensional garment geometry models with their drape expressed; and
e) instructions for compiling the one or more three-dimensional garment geometry models together with data including one or more of optical attribute data and mechanical attribute data into a set of data constituting the digital instance of one or more garment samples for use in future renderings of garment portrayals.

* * * * *

UNITED STATES PATENT AND TRADEMARK OFFICE
CERTIFICATE OF CORRECTION

PATENT NO. : 8,364,561 B2
APPLICATION NO. : 12/798879
DATED : January 29, 2013
INVENTOR(S) : Andre E. Wolper et al.

It is certified that error appears in the above-identified patent and that said Letters Patent is hereby corrected as shown below:

In the Claims:

Column 12:
  In Claim 1, at line 28, replace "of panels that are oriented, in virtual three-dimensional" with --of panels that are oriented in virtual three-dimensional--;

Column 13:
  In Claim 6, at line 16, replace "and its corresponding surface optical attributes or the garment" with --and its corresponding surface optical attributes of the garment--.

Signed and Sealed this
Seventh Day of May, 2013

Teresa Stanek Rea
*Acting Director of the United States Patent and Trademark Office*